US012786206B2

(12) United States Patent
Pintiysky et al.

(10) Patent No.: US 12,786,206 B2
(45) Date of Patent: Nov. 3, 2026

(54) SYSTEM AND METHOD FOR FILTERING EVENTS FOR TRANSMISSION TO REMOTE DEVICES

(71) Applicant: AO Kaspersky Lab, Moscow (RU)

(72) Inventors: Vladislav V. Pintiysky, Moscow (RU); Dmitry V. Tarakanov, Moscow (RU); Alexey S Shulmin, Moscow (RU); Vladislav I. Ovcharik, Moscow (RU); Vladimir A. Kuskov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 224 days.

(21) Appl. No.: 18/459,488

(22) Filed: Sep. 1, 2023

(65) Prior Publication Data

US 2024/0214399 A1 Jun. 27, 2024

(30) Foreign Application Priority Data

Dec. 21, 2022 (RU) ........................... RU2022133607

(51) Int. Cl.
*H04L 41/0604* (2022.01)
*H04L 9/40* (2022.01)

(52) U.S. Cl.
CPC ...... *H04L 63/1416* (2013.01); *H04L 41/0604* (2013.01); *H04L 63/1425* (2013.01)

(58) Field of Classification Search
CPC ............................ H04L 41/06; H04L 41/0604
See application file for complete search history.

(56) References Cited

U.S. PATENT DOCUMENTS 8,230,507 B1 * 7/2012 Njemanze ........... H04L 63/1408 726/23
2017/0041373 A1 * 2/2017 Tal ......................... G06Q 10/10
2017/0093902 A1 * 3/2017 Roundy ................ G06F 21/554
2020/0117566 A1 * 4/2020 Harutyunyan ........ G06F 21/552
2022/0066998 A1 * 3/2022 Jha ...................... G06F 11/3476
2022/0158889 A1 * 5/2022 Jha .......................... H04L 67/10
2023/0111783 A1 * 4/2023 Yanowitz ............ G06F 16/9535 705/2
2025/0047577 A1 * 2/2025 Dade ..................... H04L 43/028

FOREIGN PATENT DOCUMENTS

CN 113672447 A 11/2021

* cited by examiner

*Primary Examiner* — Joshua Joo
(74) *Attorney, Agent, or Firm* — ArentFox Schiff LLP; Michael Fainberg

(57) ABSTRACT

Disclosed herein are systems and methods for filtering events for transmission to a remote device. In one aspect, an exemplary method comprises, collecting events and identifying, for each event of the collected events, a type the collected events belong to from among a predetermined list of types of events, and determining, for each type of events that is identified, a selection coefficient that indicates a proportion of events of the type of events to be transmitted to a remote device, when a predetermined number of collected events is reached, combining the collected events into a sequence, and determining, for the sequence, a time interval for which a given number of events is collected, for each type of events, selecting events for transmission to the remote device based on the selection coefficient of the respective type of events, and transmitting the selected events to the remote device.

18 Claims, 4 Drawing Sheets

SYSTEM AND METHOD FOR FILTERING EVENTS FOR TRANSMISSION TO REMOTE DEVICES

CROSS REFERENCE TO RELATED APPLICATIONS

The present application claims priority to Russian Patent Application No. RU2022133607, filed on 21 Dec. 2022, the entire content of which is incorporated herein by reference.

FIELD OF TECHNOLOGY

The present disclosure relates to the field of Information Technology (IT), and more specifically to systems and methods of filtering events for transmission to remote devices.

BACKGROUND

Currently, in addition to traditional malicious software (e.g., viruses, network worms, keyloggers, ransomware, etc.), cyberattacks are very common. In particular, Targeted Attacks (TAs) and sophisticated attacks (e.g., Advanced Persistent Threat (APT)) on information systems (IS, e.g., corporate networks or other types of computing devices and networks used for their communication) are becoming more and more common. Attackers can pursue various goals—from theft of personal data of employees to industrial espionage. Often, attackers have information about the architecture of corporate networks, the principles of internal document management, the means used to protect networks and computer devices, or other information specific to the information system and often confidential documents.

Existing technologies for protection against malicious software and computer attacks, such as: signature analysis, heuristic analysis, emulation and others, have a number of shortcomings that do not allow these existing technologies to provide an adequate level of protection against targeted attacks and other cyberattacks. For example, these technologies do not allow detection and investigation of previously unknown threats, computer attacks without the use of malicious software, complex attacks (using technologies to bypass security tools) and long-lasting attacks (from several days to several years), the signs of which become known only after a long time has elapsed from the moment the attack began.

Classic anti-malware solutions are not suitable to effectively deal with APT attacks, because APT implies knowledge of the architecture of the attacked system, including the protection architecture of this system. In another approach, Security Information and Event Management (SIEM) systems may be used to detect APT attacks, for example, using integrated threat data streams, anti-APT systems for detecting advanced threats and targeted attacks, systems for investigating software samples, and by searching for information about malware characteristics using indicators of compromise. In another approach, a Managed Detection and Response (MDR) class of solutions for monitoring enterprise systems and a class of solutions for detecting and studying malicious activity on Endpoint Detection and Response (EDR) endpoints may be used. At the same time, in addition to automatic systems, analysis by information security specialists may be used. The automatic systems are used to detect information security incidents by correlating information security events (telemetry data, e.g., starting a process, loading a library, establishing a network connection and other events) that occur on endpoint devices, with data on known threats. In most cases, detected information security incidents also require analysis by an information security specialist to minimize damage, collect incident data and further respond.

Thus, one technical problem of the know IS systems is a high load on the computing resources of the remote device when processing events received from at least one computer. After all, the more computers contained in the IS, the more events are collected, which entails a higher load on the computing resources of information security systems and, as a result, a decrease in the level of detection by such information security systems. It should be noted that this problem is typical when processing events of various nature that occur on computer devices and in information systems. The IS events may include: operating system (OS) events, OS kernel events, program events, hardware events, device driver events, audit system events, and other events.

Therefore, there is a need for a more optimal way for filtering events for transmission to remote devices.

SUMMARY

Aspects of the disclosure relate to filtering events for transmission to remote devices.

In one exemplary aspect, a method is provided for filtering events for transmission to remote devices, the method comprising: collecting events, identifying, for each event of the collected events, a type the collected events belong to from among a predetermined list of types of events, and determining, for each type of events that is identified, a selection coefficient that indicates a proportion of events of the type of events to be transmitted to a remote device, when a predetermined number of collected events is reached, combining the collected events into a sequence, and determining, for the sequence, a time interval for which a given number of events is collected, for each type of events, selecting events for transmission to the remote device based on the selection coefficient of the respective type of events, and transmitting the selected events to the remote device.

In one aspect, the method further comprises: comparing, for each type of events, the time interval for which the given number of events is collected with a predetermined time period; updating, for each type of events, the selection coefficients based on results of the comparison; and applying the updated selection coefficients for a next sequence of the collected events.

In one aspect, when the time interval for which the given number of events is collected is greater than or equal to the predetermined time period, the selection coefficients for all types of events are set to a first group of values of selection coefficients, and when the time interval for which the given number of events is collected less than the predetermined time period, the selection coefficients for all types of events are set to a second group of values of selection coefficients.

In one aspect, the first group of values of selection coefficients comprises values that are equal to one for all types of events.

In one aspect, the second group of values of selection coefficients comprises values that are equal to one only for types of events that are required.

In one aspect, when the time interval for which the given number of events is collected less than the predetermined time period and a number of events of at least one of the types of events exceeds a predetermined threshold, the selection coefficient of the type of events for which the number of events exceeds the predetermined threshold is set to a first value according to a formula: $U=(\Delta t)/T\times U_s$; and $U_s=1-N_s/N$; wherein, U is the first value; Δt is the time interval for which the given number of events is collected; T is the predetermined time period; $U_s$ is a weighing coefficient; $N_s$ is a number of events of the types of events for which the number of events exceeds the predetermined threshold; and N is the given number of events that is collected.

In one aspect, the predetermined time period and the given number of events are adjusted based on computing resources of the remote device and the predetermined time period is configured in proportion to the given number of events.

In one aspect, for each type of events, the selecting of events for the transmission to the remote device further comprises randomly selecting events for transmission to the remote device in accordance with the selection coefficient of the respective type of events.

In one aspect, for a first collected events comprising the given number of events, the selection coefficient for each type of events comprises a value equal to one.

In one aspect, the collected events comprise Information Security (IS) events.

In one aspect, the further comprises: receiving feedback from a remote device in a form of an identified IS incident, information about a contribution of a certain event or a type of events to the IS incident.

In one aspect, the method further comprises: determining a selection coefficient for at least one type of events based on the contribution of the type of events to the IS incident.

In one aspect, for each type of events, the selecting of the events for transmission to the remote device is further based on respective contributions of the type of events to the IS incident.

In one aspect, for two types of events, the selection coefficient of a first type of events of the two types of events is set greater than the selection coefficient of the second type of events of the two types of events, when among the events that are collected, the number of events of the first type of events is less than the number of events of the second type of events.

In one aspect, the time interval for which the given number of events is collected is determined as a difference between a timestamp of a first event of the collected events of the sequence and a timestamp of a last event of the collected events of the sequence.

According to one aspect of the disclosure, a system is provided for filtering events for transmission to remote devices, the system comprising at least one hardware processor of a computing device configured to: collect events, identify, for each event of the collected events, a type of events from among a predetermined list of types of events, and determine, for each type of events that is identified, a selection coefficient that indicates a proportion of events of the type of events to be transmitted to a remote device, when a predetermined number of collected events is reached, combine the collected events into a sequence, and determine, for the sequence, a time interval for which a given number of events is collected, for each type of events, select events for transmission to the remote device based on the selection coefficient of the respective type of events, and transmit the selected events to the remote device.

In one exemplary aspect, a non-transitory computer-readable medium is provided storing a set of instructions thereon for filtering events for transmission to remote devices, wherein the set of instructions comprises instructions for: collecting events, identifying, for each event of the collected events, a type of events from among a predetermined list of types of events, and determining, for each type of events that is identified, a selection coefficient that indicates a proportion of events of the type of events to be transmitted to a remote device, when a predetermined number of collected events is reached, combining the collected events into a sequence, and determining, for the sequence, a time interval for which a given number of events is collected, for each type of events, selecting events for transmission to the remote device based on the selection coefficient of the respective type of events, and transmitting the selected events to the remote device.

The method and system of the present disclosure are designed to provide improvements in filtering events for transmission to remote devices. The first technical effect is to reduce the load on the computing resources of a remote device that processes events received from at least one computer. Another technical effect is to filter events by determining for each type of events the proportion of events to be transmitted to the remote device, taking into account the time interval for which a specified number of events were collected.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
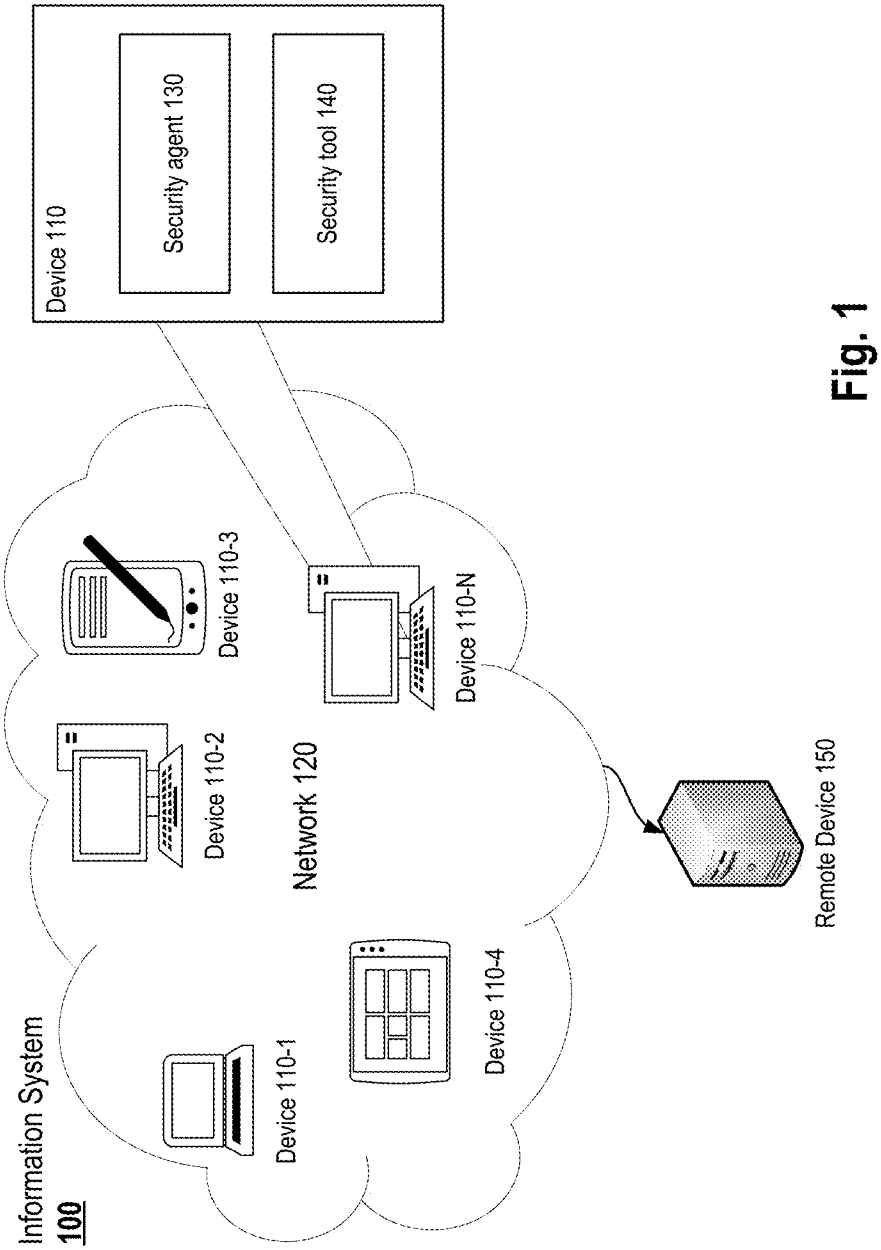
FIG. 1 illustrates an example of an information system in accordance with aspects of the present disclosure.

FIG. 1 illustrates an example of an information system 100 in accordance with aspects of the present disclosure. In one aspect, the information system 100 comprises a set of computer devices 110 connected to each other and to a remote device 150 via a computer network 120. Each computer device 110 is equipped with a security agent 130 which is designed to implement the method of filtering events to be transmitted to the remote device 150. The events being filtered may occur directly on the computer devices 110, in the network 120, or in the information system 100, and may have a different nature of occurrence.

In one aspect, the events are understood as being information security events (for example, starting a process, loading a library, establishing a network connection, and other information security events). However, the method of the present disclosure is also applicable to other types of events, in particular, OS events, OS kernel events, software events, hardware events, device driver events, audit system events and other events.

In one aspect, the information about the event may be obtained by the security agent 130 from various event sources, in particular, from a security tool 140, from one or more event logs, one or more network logs, and other sources. In one aspect, the security agent 130 is also designed to select all or part of the events to be transmitted to the remote device 150, for example, to a server. In one aspect, the subsequent transmission of the selected events to the remote device 150 is also carried out by the security agent 130. In one aspect, in the case of filtering and transmitting information security events, the most advanced analysis, by the remote device 150, is used to detect information security incidents by correlating information security events using various solutions, e.g., SIEM, EDR, MDR and others.

In one aspect, the events may include information about objects on the computer devices 110 and on the network 120. In one aspect, the object on the computer devices 110 and/or the network 120 may be, for example, a file (hash of a given file), a process, a library, a URL, an IP address, a certificate, a file execution log, or any other object on the device 110 or the network 120. In one aspect, the information about objects may include identifier, name, timestamp, metadata, and other possible information about objects.

In one aspect, the events may be grouped by types of events. The type of events may be predefined, defined, or configured during the operation of the system, either on the computer device 110 itself or on the remote device 150. The type of events is needed to summarize the same type of events associated with different objects. For example, the events "start process 1" and "start process 2" are different events that belong to the same type of event: "start process". Therefore, multiple events can belong to the same type of events.

Other examples of types of events, in particular information security events, are presented below:

- passing of the object through an anti-virus interface, e.g., Antimalware Scan Interface (AMSI)—amsi_scan;
- loading driver—driver_load;
- a obtaining of a system log—event_log;
- an event associated with file information file;
- an event for modifying/creating/deleting a file—file_change;
- an event for opening a session and logging in a user—logon_session.
- an event for a network connection—network_connection;
- an event for an opening of a network port—network_port_listen;
- an event for entering data into a console—process_console_interactive_input;
- an event for creating a process—process_create.
- an event for loading libraries—process_module_load;
- an event for a process termination—process_terminate;
- an event for modifying process—token process_token_change;
- an event for making changes to the registry—registry_change;
- an event for detecting a verdict of a security tool or modules of the security tool, including inaccurate verdict or test signatures—threat_detect;
- an event for a remediation action of the security tool on a detected threat—threat_processing_result;
- an event associated with information about internetworking;
- an event associated with indicators of compromise (IOC, also known as indicators of infection); and
- an event associated with object metadata, e.g., the checksum of the object.

The list of information security events provided above is not exhaustive. As such, there may be other types of events that are not specified here.

In one aspect, the computer devices 110 may further include the security tool 140 which may be designed to ensure information security.

In one aspect, using the example of filtering information security events, the security tool 140 may receive feedback from the remote device 150 about the result of the analysis of the transmitted events. For example, the security tool 140 may receive feedback about detected information security incidents to improve the security of computer devices 110.

In one aspect, the feedback from the remote device 150 may include signatures, heuristics, rules for the emulator, and other instructions for detecting new malware on the computer devices 110. In addition, the feedback may further include more detailed information about the detected information security incident. For instance, the feedback may include a list of information security events and conditions that led to the information security incident, the contribution of the mentioned information security events to the information security incident, and the like. In one aspect, the feedback may further contain information about the contribution of events of certain types of events to the information security incident. For example, events such as "network connection" can have a greater contribution to an information security incident than events such as "starting a process". Taking into account the feedback received, the security tool 140 may then perform actions to ensure the information security of the computer device 110, in particular, the security tool 140 may search for and eliminate vulnerabilities and malware, while taking into consideration the new instructions, changing the information security settings of the computer device 110, as well as other actions.

In one aspect, a modification of information security settings of the computer device 110 includes one or more of the following:

- an implementation of anti-virus scanning with up-to-date databases;
- a changing of the settings of the network 120;
- a limiting of the functionality of the computer device 110;
- a restricting of the interaction of the computer device 110 with other devices;
- a restricting of access(es) to resources of the computer device 110;
- an enabling of multi-factor authentication;
- an update of a security on the computing device, e.g., by the security tool 140; and
- a receiving of feedback on results of one or more of the above modifications of security settings.

In one aspect, the security tool 140 may include one or more modules designed to ensure the security of the computer device 110, the one or more modules including at least one of: an on-access scanner, an on-demand scanner, an email antivirus software, a web antivirus software, a proactive protection module, a Host Intrusion Prevention System (HIPS) module, a Data Loss Prevention (DLP) module, a vulnerability scanner, an emulator, a firewall, etc. In one aspect, these modules may be an integral part of the security tool 140. In another aspect, these modules may be implemented as separate software components. In yet another aspect, the security agent 130 is one of the modules of the security tool 140.

In one aspect, the on-access scanner contains the functionality of detecting malicious activity of all opened, launched and saved files on the user's computer system. An on-demand scanner differs from the on-access scanner in that it scans user-defined files and directories at the user's request.

In one aspect, the email antivirus software may be used to control incoming and outgoing e-mail for malicious objects. In one aspect, the web antivirus software may be used to prevent the execution of malicious code that may be contained on websites when the user visits them, as well as to block opening of websites. In one aspect, the HIPS module may be used to detect unwanted and malicious activity of programs and block the program at the time of execution. In one aspect, the DLP module may be used to detect and prevent the leakage of confidential data outside the computer or network. In one aspect, the vulnerability scanner may be required to detect vulnerabilities on a computer (for example, some components of the protection tool are disabled, outdated virus databases, closed network ports, etc.). In one aspect, the firewall may monitor and filter network traffic in accordance with specified rules. In one aspect, the emulator may be used to simulate a guest system while the code is running in the emulator. In one aspect, the proactive protection module may use behavioral signatures to detect the behaviors of executable files and classify the respective executable files according to their respective levels of trust.

In one aspect, the various modules described above, when malware is detected (suspicious behavior, spam and other signs of a computer threat), may create a corresponding notification (which may then be converted into a verdict of the security tool 140) indicating, to the security tool 140, the detected threat and the need to take actions to eliminate the threat (for example, by deleting or modifying a file, prohibiting execution, etc.). In one aspect, the module that detected the malware (i.e., the module itself) may take steps to eliminate the threat. In another aspect, the verdict may be inaccurate (since this verdict may give false positives) or may be a test verdict. In this case, the security tool 140 may not perform actions to eliminate the threat, but will transmit the notification further, to the remote device 150. It is worth noting that the verdict of the security tool 140 is part of the information about the object (file, process), which may then be transmitted to the security agent 130 in the form of an information security event.

Figure 2:
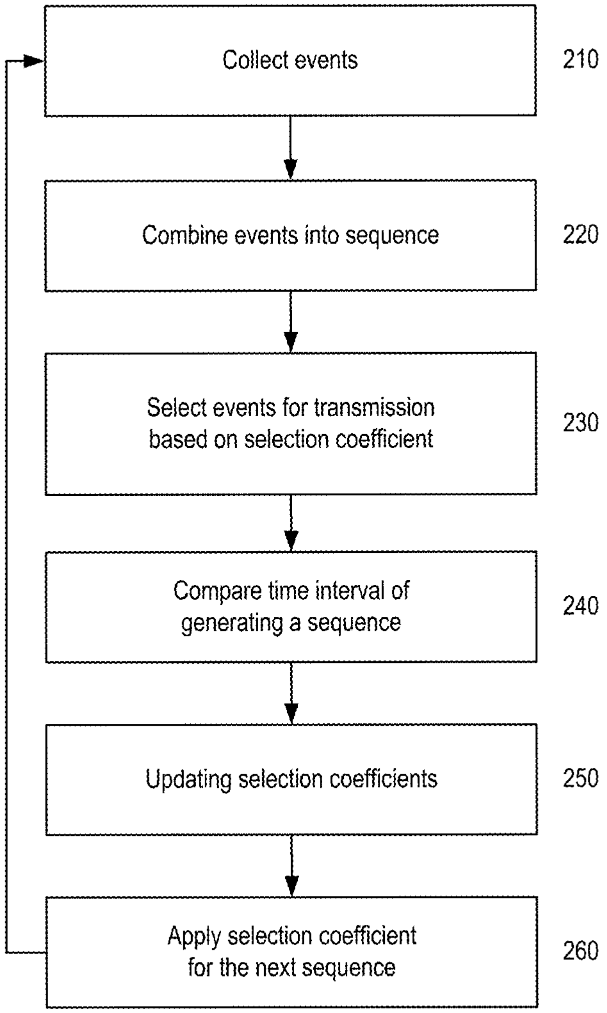
FIG. 2 illustrates an example of a method of filtering events for transmission to a remote device in accordance with aspects of the present disclosure.

FIG. 2 illustrates an example of a method 200 for filtering events for transmission to a remote device 150 in accordance with aspects of the present disclosure. In one aspect, the method 200 may be carried out using a security agent 130 implemented on a computer device 110 (for example, a computer 20 in FIG. 4).

In step 210, method 200 collects events that occur and, for each collected event, identifies at least one type of events from among a predetermined list of types of events, and determines, for each type of events that is identified, a selection coefficient (U) that indicates a proportion of events of the type of events to be transmitted to a remote device, e.g., the remote device 150.

Figure 4:
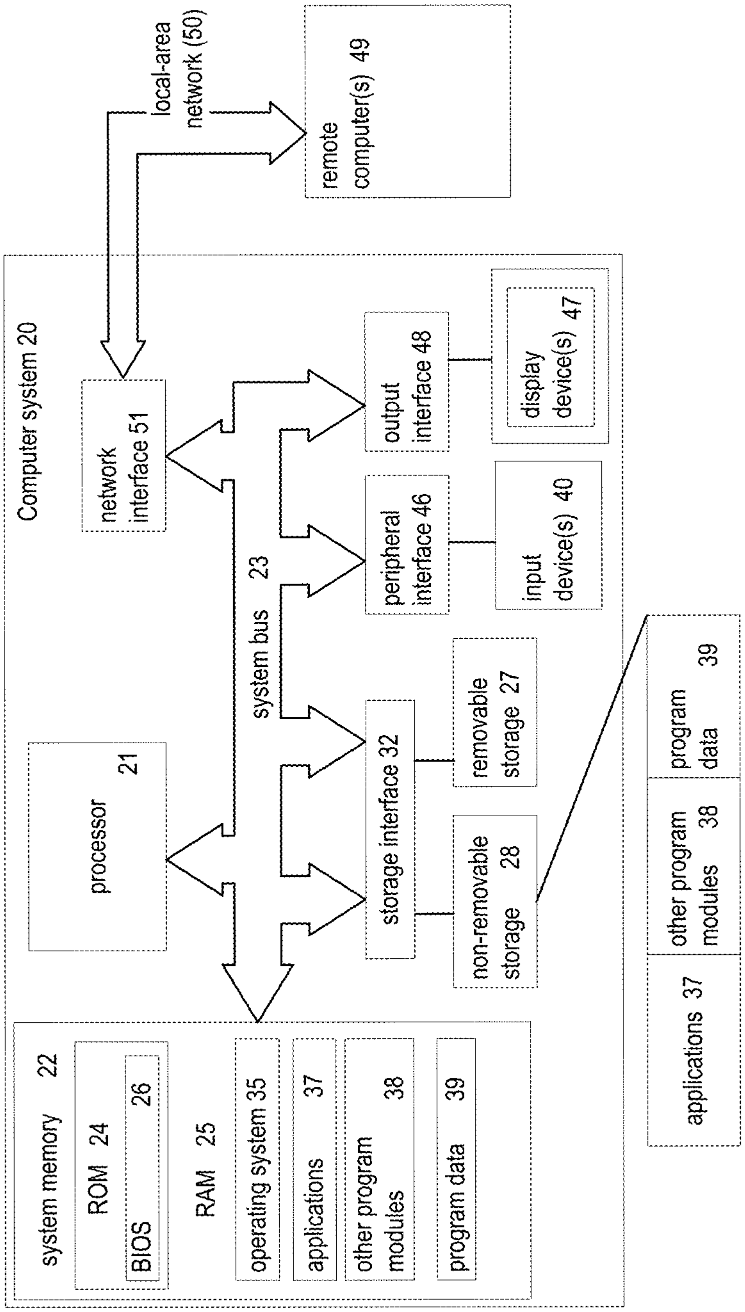
FIG. 4 presents an example of a general purpose computer system on which aspects of the present disclosure can be implemented.

Thus, for each type of events, a specific selection coefficient U is determined. In one aspect, the remote device to which events are to be transmitted may be the computer 20, as shown in FIG. 4. It is worth noting that the attribute of the selection coefficient determined for a certain type of events is equivalent to the characteristic of the proportion of events to be transmitted to the remote device 150 among the events of the types of events described above. For brevity, the selection coefficient is a feature that will be mainly used by the method of the present disclosure.

In one aspect, the selection coefficient U may be represented as a vector of K elements, wherein K represents the number of types of events. Then, the elements of the vector may be represented by U j, j representing the number of the type of events from 1 to K. Then, the vector $U=[U_1, U_2, \ldots, U_k]$. In one aspect, each element of the vector U j is equal to the chosen coefficient for the corresponding type of events.

In step 220, when a predetermined number of collected events (N) is reached, method 200 combines the collected events into a sequence and determines, for the sequence, a time interval (Δt) for which a given number of events (N) is collected. It is worth noting that the number of types of events collected is lower than or equal to the number of events collected, that is, K≤N. It is also worth noting that method 200 operates continuously on a stream of events occurring on at least one computer device 110, in the network 120, or in the information system 100. Moreover, the processing of events in order to filter them is carried out within the framework of sequentially accumulated (or generated) sequences of events in amount of N events. In one aspect, the number N is a configurable value. That is, when the next sequence of N events is accumulated, this accumulated sequence is processed according to method 200, after which the next sequence of N events is accumulated, and so on.

In step 230, for each type of events, method 200 selects events for transmission to a remote device 150 based on the selection coefficient U of the respective type of event. That is, for each specific type of events, from among the events of the specific type of events, events are selected for transmission to the remote device 150, the portion of events to be transmitted being equal to the corresponding selection coefficient U.

In step 240, method 200 compares, for each type of events, the time interval (Δt) for which the given number of events is collected with a predetermined time period (T).

In one aspect, the comparing of the time interval of the generating the sequence comprises establishing the selection coefficients U (also the proportion of events) for at least one type of events depending on the predetermined time interval Δt. In a preferred aspect, the proportion of events for at least one type of events is established depending on a result of a comparison of the selection coefficient with a certain time interval Δt with the given time period (T). In this case, in step 240, method 200 compares the time interval (Δt) for which the sequence is formed with the specified time period (T).

In one aspect, the time interval (Δt) for which the sequence is formed is determined as a difference between a timestamp of a first event in the sequence and a timestamp of a last event in the sequence.

In one aspect, the timestamp of the event may denote any moment in time that characterizes the event, for example, the moment of time of occurrence events, the time when the event was generated by the event source, the time when the event was received (collected) by the security agent 130, etc. In addition, in one aspect, the timestamp may be set by the time as determined by the event source or by the time as determined by the event receiver, i.e., by the time determined by the security agent 130.

In step 250, method 200 updates, for each type of events, the selection coefficients (U) based on results of the comparison in step 240. An example of establishing the selection of coefficients (U) is presented below.

In step 260, the updated selection coefficients are used for a next sequence of the collected events—that is, steps 210-250 of method 200 are repeated.

In one aspect, the values of the number of events N and the time period T are configured depending on the characteristics of the computer device 110, the information system 100 to which the computer device 110 is connected, or the computing resources of the remote device 150. In one aspect, the time period (T) is configured in proportion to the number of events (N).

For example, T may be calculated based on a function of the following parameters: $T_0$, $N_{ideal}$, N, where $N_{ideal}$ is the planned number of events sent during the base time period ($T_0$). Parameter values $T_0$, $N_{ideal}$, N are preset. It is worth noting that the set of parameters $N_{ideal}$ and $T_0$ characterizing the scheduled sending of events can be selected based on the requirements for the computing resources of the remote device 150, which receives and analyzes events. For example, the remote device 150 may process no more than $N_{ideal}$ events in the base time period $T_0$ (e.g., hour, minute, ten seconds, second, etc.). Therefore, in order to satisfy this requirement, N events must be sent for the period of time T. Therefore, the result of comparing Δt with T indicates the rate of occurrence of events (the number of events per unit of time), and the decision to establish the values of the selection coefficients (U) is made depending on the change in the rate of occurrence of events. For example, if events occur rarely ($\Delta t \geq T$), which is equivalent to a low rate of occurrence of events, then high selection factors (U) can be set so that most or all of the events are selected for further transmission to the remote device 150. After all, such a number of selected events will not lead to a high load or overload of the computing resources of the remote device 150. Otherwise, when events occur frequently ($\Delta t < T$), this corresponds to high rate of occurrence of events. In this case, lower selection factors (U) will be set to reduce the load on the computing resources of the remote device 150.

Thus, in one aspect, if, as a result of comparison, Δt is equal to or greater than T, the method sets the selection coefficients (U) for all types of events to the first group of values. Otherwise, the method sets the selection coefficients (U) for all types of events to the second group of values. The groups of values are predefined and contain values that are assigned to the corresponding selection coefficients (U). In one aspect, the first group of values contains values equal to one for all types of events. It is worth noting that the values of the selection coefficients (U) may be set in a range from 0 to 1. In another aspect, the second group of values additionally contains values equal to one for types of events that are marked as required by the types of events—this will reduce the load on the computing resources of the remote device 150, but at the same time send events of required types. Using the example of filtering information security events, this will also maintain a balance between a high level of information security and a low load on the remote device 150 that processes events received from at least one computer device 110. The required types of events will be discussed in more detail below.

It should be noted that, in the case of processing information security events, after the information security event selected in step 230, the information security events may be sent for analysis to the remote device 150, which in turn may detect information security incidents by correlating information security events using various solutions, for example, SIEM, EDR, MDR and others. Further, with the help of security tools 140, feedback is received from the remote device 150, the feedback being based on results of the detecting of the information security incidents to improve the security of computer devices 110. In one aspect, the security tool 140 performs actions to ensure the information security of the computer device 110 while taking into account the received feedback. Examples of implementation for performing the actions to ensure the information security were described above in conjunction with FIG. 1.

In one aspect, for each type of events, using the security agent 130, the selection coefficient (U) is set depending on contributions of events of this particular type of events to the information security incident. The following is an example of such a change. In another aspect, using the security agent 130, for each type of events, the portion of events to be transmitted to the remote device 150 is selected in accordance with the contribution of events of the specified type of events to the information security incident for example, select the events with the highest contribution in quantity equal to the portion of events for the corresponding type. For example, if 100 events of the same type are collected, and the portion of events for that type is 10%, then the remote device 150 may select the 10 events of that type with the highest contribution to be transmitted to the remote device. In another aspect, for each type of events, the security agent 130 selects the proportion of events to be transmitted to the remote device randomly.

Below is an example of how method 200 operates. At the start of the execution of method 200 (i.e., when forming the first sequence of N events), the values for the selection coefficients (U) for each type of events are set (determined) according to the first group values and, in particular, they are set to one. Thus, from the formed first sequence of events, all events will be selected and transmitted to the remote device 150. Next, whether there is a need to change the selection coefficients (U) is determined. In one aspect, whether or not there is a need to change the selection coefficients is determined based on an evaluation of information about the events selected and transmitted from the first sequence of events, namely, based on determining the time interval Δt of the formation of the sequence and the comparison with the value of the parameter T, i.e., the time period. If the time interval Δt is equal to or exceeds the value of the parameter T, then the coefficients remain the same (i.e., as set according to the first group of values). Otherwise, if the time interval Δt is lower than the value of the parameter T, then the values of the selection coefficients (U) are changed (i.e., set to the second group of values). After that, the updated (originally set or modified) selection coefficients (U) are used to select the events to be transmitted to the remote device 150 from the second sequence. Thus, the selection and number of events to be transmitted to the remote device 150 from each new sequence is based on the selection coefficients (U) calculated based on the previous sequence. It is worth noting that when the selection coefficients (U) are different from the original values, and the time interval Δt has become equal to or higher than the specified value of the parameter T, then the selection coefficients (U) for the subsequent sequence are changed (set) to the original values according to the first group of values.

In one aspect, method 200 may allow the process to evolve in a manner to enable the method to select a more accurate set of events for transmission for subsequent sequences of events. At the same time, in one aspect, all events are selected from the first sequence to be transmitted to the remote device 150 based on considerations of completeness of the information for analysis by the remote device 150. Typically, the first sequence of events contains the identifiers and corresponding names of all or most of the processes and other objects on the corresponding computer device 110. While subsequent sequences may contain only identifiers, but do not contain the names of processes and other objects. Accordingly, if not all events are selected from the first sequence, then some of the names may be lost, which may lead to difficulty or even impossibility of matching identifiers of processes and other objects on the computer devices 110 with their respective names when analyzing events on the remote devices 150. A similar situation may occur when there is an initial decrease in the number of events that occur, that is, when $\Delta t$ becomes equal to or greater than T, followed by an increase when $\Delta t$ again becomes less than T. That is why the selection coefficients are calculated based on an analysis of the current sequence of events, and are used for subsequent sequence of events. This approach allows the process to adapt to the flow rate of events that occur, as well as to the reasons for the changing of the flow rate of events (for example, in case of violations of the information security of the computer device 110).

In one aspect, the mandatory types of events described above are marked, for example, by adding a "required types of event(s)" attribute. For example, for events related to information security, the mandatory types of events may include the following: starting a process (process_create), terminating a process (process_terminate), opening a user login session (logon_session), and detecting malicious software (threat_detect), processing the result of malware detection (threat_processing_result). Thus, in this example, all events of required types will be passed for analysis. As a result, the remote device 150 is able to detect information security incidents more correctly by analyzing at least events of mandatory types. Thus, a balance will be reached between the number of information security events selected for analysis and the high level of information security. The type of events may be predefined, defined, and/or configured during the operation of the system. For example, by default, the "start process" type of events can be one of the required types. However, during the operation of the system, the type of events "start process" may no longer be mandatory, for example, if the significance of the type of events "start process" becomes lower, than that of other required types of events.

In one aspect, the significance of a type of events ($U_{s2}$) is determined by the contribution of events of that type to the information security incident that can be detected by the remote device 150, and is determined based on results of the analysis of known information security incidents and events from the previous sequences received by the remote device 150.

In one aspect, after the significance of the type of events is determined, information about the significance of the type of events is transmitted to the security agent 130 on each computer device 110.

In another aspect, if, as a result of the comparison, $\Delta t$ is less than T and a number of events of at least one of the types of events ($N_s$) exceeds a threshold ($N_t$), events of this type are marked as requiring strong filtering. Usually, such events are insignificant recurring events, the number of which is quite high.

In another aspect, the method determines if a proportion of events (N/N) in at least one of the types of events in the sequence of a configurable threshold ($N_t/N$ e.g., 20%) is exceeded. Then, if the threshold is exceeded, the method marks events of that type as requiring enhanced filtering. Moreover, in one aspect, the method may additionally calculate the weighting coefficient $U_s=1-N_s/N$ and set the selection coefficient (U) according to the formula: $U=(\Delta t)/T\times U_s$ for events marked as requiring enhanced filtering.

In another aspect, the selection coefficient further depends on the significance of the type of events $U_{s2}$. In this case, $U=(\Delta t)/T\times U_s\times U_{s2}$. Thus, events of insignificant types will be less frequently selected to be transmitted to the remote device 150 than events of other types.

In these examples, events that require enhanced filtering will be sent for analysis less frequently than other types of events that are not marked as requiring enhanced filtering. For example, suppose there are four types of possible events in the system. Suppose also it is assumed that the sequence of events contains N=1210 events. In the first sequence of events, the following number of events of each type was obtained: $N_1=1000$, $N_2=40$, $N_3=60$, $N_4=110$, where $N_i$ is the number of events of the i-th type. Threshold $N_t=50$. Then, events of types 1, 3, 4 will be marked as requiring enhanced filtering, and events of type 2 will not be marked because their number is below the threshold $N_t$. The selection coefficients U for each of the four types of events are defined as follows: $U_1=10\%$, $U_2=100\%$ (for example, the default value), $U_3=53\%$, $U_4=51\%$, where $U_i$ is the value of the selection factor U for type i-th events.

In one aspect, for two types of events, the values of the selection coefficients (U) are set such that the selection coefficient for the first type of events is higher than the selection coefficient for the second type of events, provided that the number of events of the first type in the sequence is less than the number of events of the second type.

In another aspect, the selection coefficients U are further based on characteristics of the information system. Such characteristics of the information system may include at least one of the following: the number of computer devices 110, the computing power (i.e., the computational capabilities) of the remote device 150, and others.

In another aspect, at least one of the values of N, $N_{ideal}$ is configured depending on the characteristics of the information system. For example, if the remote device 150 has low computing resources, $N_{ideal}$ may be reduced to a value at which the consumption of computing resources will be sufficient to ensure the required level of information security.

In another aspect, the time period T is calculated using the formula: $T=T_0\times N/N_{ideal}$. For example, suppose the method transmits 1500 events per hour. Then, $N_{ideal}=1500$, and $T_0=3600$ seconds (1 hour).

For example, when it is determined that sequences must contain 150 events each, that is, N=150, then the planned time period for which 150 events may be sent is set to $T=3600\times 150/1500=360$ seconds=6 minutes.

Thus, the method of the present disclosure makes it possible to solve the specified technical problem of a high load on the computing resources of a remote device when processing events received from a computer, and achieves the claimed technical results, namely, reduces the load on the computing resources of a remote device that processes events received from at least one computer, and performs filtering of events by determining, for each type of events, the portion of events to be transmitted to the remote device, while taking into account the time interval for which a specified number of events are collected.

Figure 3:
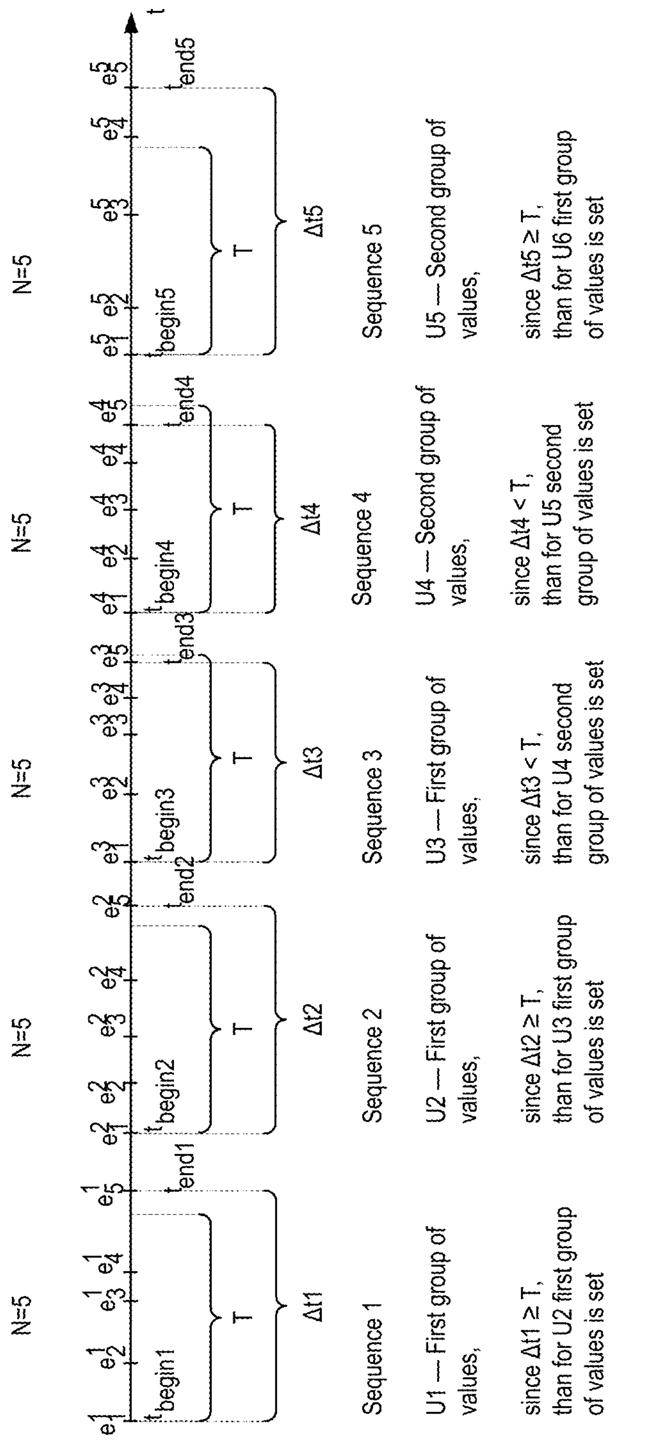
FIG. 3 illustrates an exemplary implementation of the method of the present disclosure for filtering events in accordance with aspects of the present disclosure.

FIG. 3 illustrates an exemplary implementation 300 of the method of the present disclosure for filtering events in accordance with aspects of the present disclosure. In the example of FIG. 3, the size of each sequence of events is set to five (N=5). In the example, five sequences of events are collected, five events $e_i^m$ in each sequence, where m is the number of the sequence of events from 1 to 5, i is the number of the event in the sequence m, from 1 to 5.

At the beginning, the first sequence of events $$e_i^1$$

(i from 0 to 5) is collected. For the first sequence of events the values of the vector of the selection coefficients U are set according to the first group of values, for example, equal to ones. The first sequence of events $$e_i^1$$

is selected for transmission to a remote device 150 according to the values of the vector of the selection coefficients U. Then, the method determines (calculates) the time interval Δt of the formation of the specified sequence and compares it with the given time period T. According to FIG. 3, the time between the receipt of the first and last event $\Delta t\mathbf{1}=t_{end1}-t_{begin1}$ exceeds a given period of time T, so the vector of the selection coefficients U, which will be used to select events in the second sequence, set equal to the first group of values. The situation is similar with the second sequence of events $$e_i^2.$$

However, in the formation of the third sequence of events $$e_i^3,$$

the time between the receipt of the first and of the last event $\Delta t_3=t_{end3}-t_{begin3}$ became less than the specified period of time T. Therefore, the values of the vector a of the selection coefficients U are set to the second a group of values. Thus, when the fourth sequence of events $$e_i^4$$

is received, the received events are selected for transmission to the remote device according to the values of the vector of the changed selection coefficients U. Since the time between the receipt of the first and the last event $\Delta t_4=t_{end4}-t_{begin4}$ of the fourth sequence of events is also less than the time period T, the selection coefficients U again set to the second group of values. Then, the changed selection coefficients U will be further used when filtering the fifth sequence of events. Since the time between the receipt of the first and the last event $\Delta t_5=t_{end5}-t_{begin5}$ of the fifth sequence of events exceeds the time period T, the selection coefficients U are now set to the first group of values. The changed selection coefficients U will be used to filter the sixth sequence of events (not shown in FIG. 3).

FIG. 4 is a block diagram illustrating a computer system 20 on which aspects of systems and methods for filtering events for transmission to a remote device may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A computer-implemented method for filtering events for transmission to a remote device, the method comprising:

collecting, by at least one hardware processor, a stream of events generated by one or more computing devices in an information system, and identifying, for each respective collected event, a type the respective collected event belongs to from a predetermined list of types of events, and determining, for each respective type of events that is identified, a selection coefficient that indicates a proportion of events of the respective type of events to be transmitted to the remote device;

monitoring, by the at least one hardware processor, the stream of collected events to determine when a given number of the collected events is reached, combining the collected events into a sequence, and determining, for the sequence, a time interval between a timestamp of a first event in the sequence and a timestamp of a last event in the sequence;

for each respective type of events, selecting a plurality of events from the collected events in the sequence for transmission to the remote device based on the selection coefficients;

transmitting the selected plurality of events to the remote device over a computer network;

responsive to the time interval being less than a predetermined time period, reducing, for at least one respective type of events, the selection coefficients to decrease a volume of events transmitted to the remote device, and responsive to the time interval being greater than or equal to the predetermined time period, increasing, for at least one respective type of events, the selection coefficients; and applying the updated selection coefficients for a next sequence of the collected events to regulate network traffic transmitted to the remote device based on a rate at which the stream of events are generated.

2. The method of claim 1, wherein, when the time interval is greater than or equal to the predetermined time period, the selection coefficients for all types of events are set to a first group of values of selection coefficients, and when the time interval for which the given number of events is collected less than the predetermined time period, the selection coefficients for all types of events are set to a second group of values of selection coefficients.

3. The method of claim 2, wherein, the first group of values of selection coefficients comprises values that are equal to one for all types of events.

4. The method of claim 2, wherein, the second group of values of selection coefficients comprises values that are equal to one only for types of events that are required.

5. The method of claim 1, wherein, when the time interval for which the given number of the collected events is collected less than the predetermined time period and a number of events of at least one of the types of events exceeds a predetermined threshold, the selection coefficient of the respective type of events for which the number of events exceeds the predetermined threshold is set to a first value according to a formula:

$$U = (\Delta t)/T \times U_s;$$

-continued and $$U_s = 1 - N_s/N;$$

Wherein,

U is the first value;

Δt is the time interval for which the given number of events is collected;

T is the predetermined time period;

$U_s$ is a weighing coefficient;

$N_s$ is a number of events of the types of events for which the number of events exceeds the predetermined threshold; and N is the given number of the collected events.

6. The method of claim 1, wherein the predetermined time period and the given number of the collected events are adjusted based on computing resources of the remote device and the predetermined time period is configured in proportion to the given number of events.

7. The method of claim 1, wherein, for each respective type of events, the selecting of events for the transmission to the remote device further comprises randomly selecting the plurality of events for transmission to the remote device in accordance with the selection coefficient of the respective type of events.

8. The method of claim 1, wherein, for a first set of collected events comprising the given number of events, the selection coefficient for each type of events comprises a value equal to one.

9. The method of claim 1, wherein the collected stream of events comprise Information Security (IS) events.

10. The method of claim 9, further comprising:

receiving feedback from the remote device in a form of an identified IS incident, information about a contribution of a certain event or a certain type of events to the IS incident.

11. The method of claim 10, further comprising:

determining another selection coefficient for at least one type of events based on the contribution of the certain type of events to the IS incident.

12. The method of claim 10, wherein, for each respective type of events, the selecting of the plurality of events for transmission to the remote device is further based on respective contributions of the certain type of events to the IS incident.

13. The method of claim 1, wherein, for two types of events, a first selection coefficient of a first type of events of the two types of events is greater than a second selection coefficient of the second type of events of the two types of events, when among the collected events that are collected, a first number of events of the first type of events is less than a second number of events of the second type of event.

14. The method of claim 1, wherein the time interval is determined as a difference between a timestamp of a first event of the collected events of the sequence and a timestamp of a last event of the collected events of the sequence.

15. A system for filtering events for transmission to a remote device, comprising:

at least one hardware processor of a computing device configured to:

collect a stream of events generated by one or more computing devices in an information system, and identify, for each respective collected event of the collected events, a type the respective collected event belongs to from a predetermined list of types of events, and determine, for each respective type of events that is identified, a selection coefficient that indicates a proportion of events of the respective type of events to be transmitted to the remote device;

monitor the stream of collected events to determine when a given number of the collected events is reached, combine the collected events into a sequence, and determine, for the sequence, a time interval between a timestamp of a first event in the sequence and a timestamp of a last event in the sequence;

for each respective type of events, select a plurality of events from the collected events in the sequence for transmission to the remote device based on the selection coefficients;

transmit the selected plurality of events to the remote device over a computer network;

responsive to the time interval being less than a predetermined time period, reduce, for at least one respective type of events, the selection coefficients to decrease a volume of events transmitted to the remote device, and responsive to the time interval being greater than or equal to the predetermined time period, increase, for at least one respective type of events, the selection coefficients; and apply the updated selection coefficients for a next sequence of the collected events to regulate network traffic transmitted to the remote device based on a rate at which the stream of events are generated.

16. The system of claim 15, wherein, when the time interval is greater than or equal to the predetermined time period, the selection coefficients for all types of events are set to a first group of values of selection coefficients, and when the time interval for which the given number of events is collected less than the predetermined time period, the selection coefficients for all types of events are set to a second group of values of selection coefficients.

17. The system of claim 16, wherein, the first group of values of selection coefficients comprises values that are equal to one for all types of events.

18. A non-transitory computer-readable medium storing instructions that, when executed by at least one hardware processor, cause the at least one hardware processor to perform operations for filtering events for transmission to a remote device, the operations comprising:

collecting a stream of events generated by one or more computing devices in an information system, and identifying, for each respective collected event of the collected events, a type the respective collected event belongs to from a predetermined list of types of events, and determining, for each respective type of events that is identified, a selection coefficient that indicates a proportion of events of the respective type of events to be transmitted to the remote device;

monitoring the stream of collected events to determine when a given number of the collected events is reached, combining the collected events into a sequence, and determining, for the sequence, a time interval between a timestamp of a first event in the sequence and a timestamp of a last event in the sequence;

for each respective type of events, selecting a plurality of events from the collected events in the sequence for transmission to the remote device based on the selection coefficients;

transmitting the selected plurality of events to the remote device over a computer network;

responsive to the time interval being less than a predetermined time period, reducing, for at least one respective type of events, the selection coefficients to decrease a volume of events transmitted to the remote device, and responsive to the time interval being greater than or equal to the predetermined time period, increasing, for at least one respective type of events, the selection coefficients; and applying the updated selection coefficients for a next sequence of the collected events to regulate network traffic transmitted to the remote device based on a rate at which the stream of events are generated.

* * * * *